(12) United States Patent
Matsuoka

(10) Patent No.: US 12,400,464 B2
(45) Date of Patent: Aug. 26, 2025

(54) SYSTEM FOR DIVIDING A CHARACTER STRING IN A MACHINE TRANSLATION PROCESS

(71) Applicant: NTT DOCOMO, INC., Chiyoda-ku (JP)

(72) Inventor: Hosei Matsuoka, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 450 days.

(21) Appl. No.: 17/907,602

(22) PCT Filed: Feb. 2, 2021

(86) PCT No.: PCT/JP2021/003764
§ 371 (c)(1),
(2) Date: Sep. 28, 2022

(87) PCT Pub. No.: WO2021/199654
PCT Pub. Date: Oct. 7, 2021

(65) Prior Publication Data
US 2023/0141191 A1 May 11, 2023

(30) Foreign Application Priority Data
Apr. 2, 2020 (JP) ................................ 2020-066505

(51) Int. Cl.
*G06V 30/148* (2022.01)
*G06F 40/44* (2020.01)

(52) U.S. Cl.
CPC ............ *G06V 30/153* (2022.01); *G06F 40/44* (2020.01)

(58) Field of Classification Search
CPC ..... G06V 30/153; G06F 40/44; G06F 40/284; G06F 40/216; G06F 40/289; G06F 40/55; G06N 3/084
See application file for complete search history.

(56) References Cited

U.S. PATENT DOCUMENTS

| | | | |
|---|---|---|---|
| 6,473,754 B1* | 10/2002 | Matsubayashi | G06F 16/30 707/999.005 |
| 2001/0009009 A1* | 7/2001 | Iizuka | G06F 40/253 715/272 |

(Continued)

FOREIGN PATENT DOCUMENTS

JP 2015-60127 A 3/2015

OTHER PUBLICATIONS

International Preliminary Report on Patentability and Written Opinion issued Oct. 13, 2022, in PCT/JP2021/003764, 5 pages.

(Continued)

*Primary Examiner* — Iriana Cruz
(74) *Attorney, Agent, or Firm* — Oblon, McClelland, Maier & Neustadt, L.L.P.

(57) ABSTRACT

A dividing device includes: an acquisition unit that acquires a plurality of words constituting a character string one by one from a head of the character string; a first calculation unit that calculates a forward division likelihood indicating a likelihood of dividing the character string at a position in front of a first word acquired by the acquisition unit and a backward division likelihood indicating a likelihood of dividing the character string at a position immediately after the first word; a detection unit that detects a division point based on the forward division likelihood and the backward division likelihood, the division point being a position at which the character string is divided; a generation unit that generates a chunk by dividing the character string at the division point; and an output unit that outputs the chunk.

11 Claims, 9 Drawing Sheets

(56) References Cited

U.S. PATENT DOCUMENTS

| | | | | |
|---|---|---|---|---|
| 2008/0154577 A1* | 6/2008 | Kim | .................. | G06F 40/45 |
| | | | | 704/5 |
| 2012/0016664 A1* | 1/2012 | Ando | ................ | G06F 40/284 |
| | | | | 704/9 |
| 2015/0081272 A1* | 3/2015 | Kamatani | ............ | G06F 40/284 |
| | | | | 704/235 |
| 2020/0410345 A1* | 12/2020 | Morishita | ............ | G06N 3/08 |

OTHER PUBLICATIONS

International Search Report issued Apr. 20, 2021 in PCT/JP2021/003764 filed on Feb. 2, 2021, 2 pages.

* cited by examiner

SYSTEM FOR DIVIDING A CHARACTER STRING IN A MACHINE TRANSLATION PROCESS

TECHNICAL FIELD

The present disclosure relates to a dividing device.

BACKGROUND ART

In order to perform machine translation of a sequentially input character string such as a character string obtained by performing speech recognition on an utterance, it is required to divide the character string into appropriate processing units. For example, Patent Literature 1 discloses a processing device that divides a character string into character strings of processing units at a division point indicating a position of a morpheme that can be a start position of a processing unit of natural language processing with respect to a character string obtained by connecting a fixed character string obtained by speech recognition processing and a candidate character string corresponding to a voice activity in the middle of speech recognition processing. This processing device detects each division point for a plurality of character strings obtained by connecting a fixed character string with each of a plurality of candidate character strings, and when a common character string is included in a partial character string obtained by dividing each character string at the division point, the character string is used as a character string of a processing unit.

CITATION LIST

Patent Literature

Patent Literature 1: Japanese Unexamined Patent Publication No. 2015-60127

SUMMARY OF INVENTION

Technical Problem

Since a plurality of character strings are processed in the processing device described in Patent Literature 1, it may take a lot of time to process them. Therefore, when a character string input in real time is translated simultaneously, a delay may occur.

The present disclosure describes a dividing device capable of improving processing speed.

Solution to Problem

A dividing device according to an aspect of the present disclosure is a device that divides a character string into chunks which are processing units. The dividing device includes: an acquisition unit that acquires a plurality of words constituting the character string one by one from a head of the character string; a first calculation unit that calculates a forward division likelihood indicating a likelihood of dividing the character string at a position in front of a first word acquired by the acquisition unit and a backward division likelihood indicating a likelihood of dividing the character string at a position immediately after the first word; a detection unit that detects a division point based on the forward division likelihood and the backward division likelihood, the division point being a position at which the character string is divided; a generation unit that generates a chunk by dividing the character string at the division point; and an output unit that outputs the chunk.

In the dividing device, words constituting the character string are acquired in order from the head of the character string, and the forward division likelihood indicating the likelihood of dividing the character string at a position in front of the acquired first word and the backward division likelihood indicating the likelihood of dividing the character string at a position immediately after the first word are calculated. Then, the division point is detected based on the forward division likelihood and the backward division likelihood, and the chunk is generated by dividing the character string at the division point. Since the forward division likelihood and the backward division likelihood are calculated using one first word and the division point is detected, it is not necessary to process a plurality of character strings. As a result, the time required for generating a chunk can be shortened, and the processing speed can be improved.

Advantageous Effects of Invention

According to the present disclosure, the processing speed can be improved.

DESCRIPTION OF EMBODIMENTS

In the following, embodiments of the present disclosure will be described with reference to the drawings. It should be noted that in the description of the drawings, the same components are designated with the same reference signs, and the redundant description is omitted.

Figure 1:
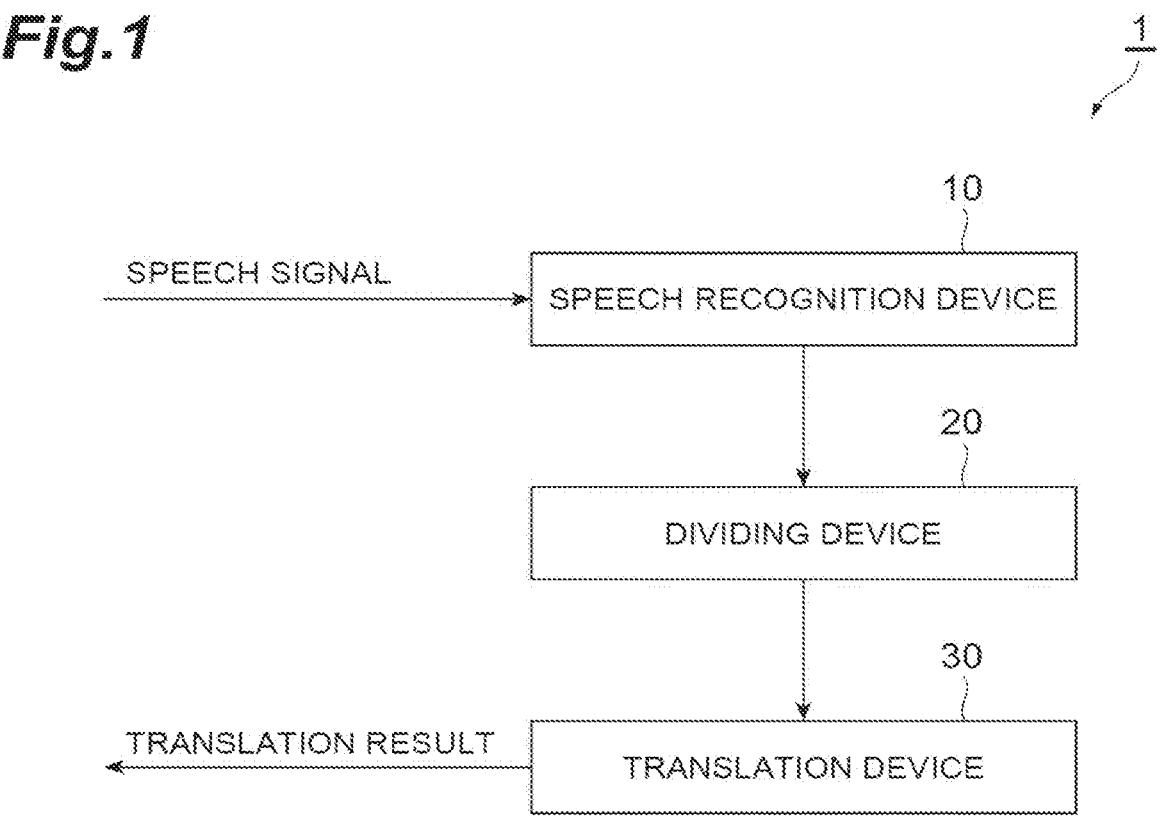
FIG. 1 is a schematic configuration diagram of a translation system including a dividing device according to an embodiment.

A configuration of a translation system including a dividing device according to an embodiment will be described with reference to FIG. 1. FIG. 1 is a schematic configuration diagram of a translation system including a dividing device according to an embodiment. A translation system 1 shown in FIG. 1 is a system for translating a content of an utterance in real time. The translation system 1 includes a speech recognition device 10, a dividing device 20, and a translation device 30.

The speech recognition device 10 is a device for converting a speech signal into a character string (text data). For example, when a user speaks using a microphone, the microphone generates a speech signal corresponding to the utterance. The speech recognition device 10 generates a character string by performing a known speech recognition process on a speech signal. The speech recognition device 10 performs speech recognition processing using, for example, an acoustic model and a language model. Since the language model has been learned in units of morphological analysis, the speech recognition device 10 generates a character string divided into word units as a speech recognition result. Each time the speech recognition device 10 generates a speech recognition result for one word, the speech recognition device 10 sequentially outputs the word to the dividing device 20.

The dividing device 20 is a device for dividing a character string input from the speech recognition device 10 into chunks. A chunk is a processing unit to be processed in a processing unit following the dividing device 20. Here, since the processing unit following the dividing device 20 is the translation device 30, the chunk is a processing unit suitable for the translation processing performed by the translation device 30. An example of the dividing device 20 is an information processing device such as a server device. Details of the dividing device 20 will be described later.

The translation device 30 is a device for translating a character string in units of chunks. The translation device 30 is, for example, a simultaneous translation (real-time translation) device. The translation device 30 translates a chunk by using bilingual data for simultaneous translation. The translation device 30 may be a machine translation model for operating a computer to receive chunks as input and output translation results. An example of the machine translation model is a neural machine translation (NMT) model. In this case, the translation device 30 is generated by executing machine learning using each of a plurality of bilingual data included in a bilingual corpus for simultaneous translation as learning data. The translation device 30 sequentially outputs translation results obtained by translating the chunks. The translation device 30 outputs a translation result to an output device such as a display and a speaker (not shown).

Figure 2:
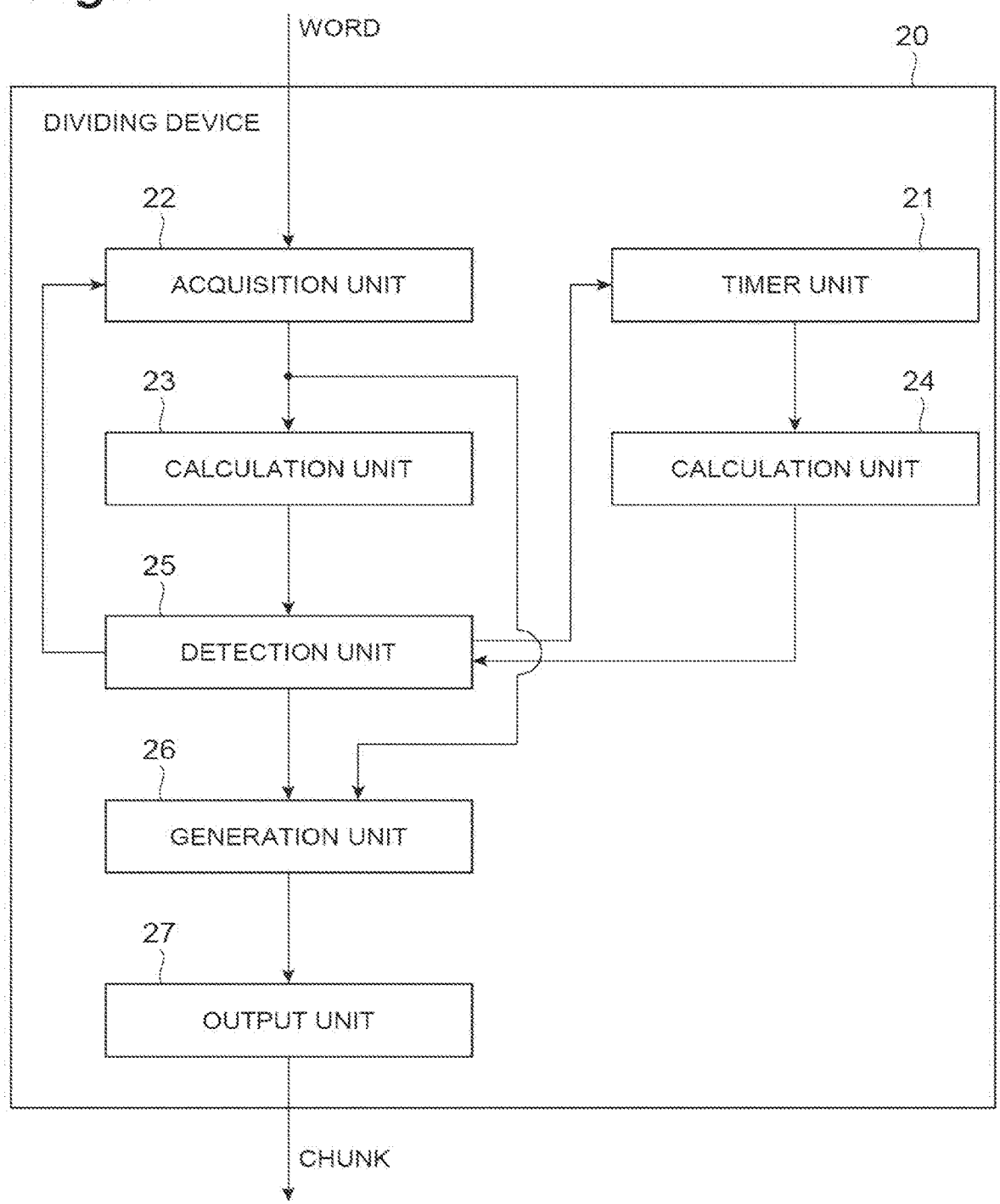
FIG. 2 is a block diagram showing a functional configuration of the dividing device shown in FIG. 1.

A functional configuration of the dividing device 20 will be described with reference to FIG. 2. FIG. 2 is a block diagram showing a functional configuration of the dividing device shown in FIG. 1. As shown in FIG. 2, the dividing device 20 functionally includes a timer unit 21, an acquisition unit 22, a calculation unit 23 (first calculation unit), a calculation unit 24 (second calculation unit), a detection unit 25, a generation unit 26, and an output unit 27. Since the function (operation) of each functional unit will be described in detail in the description of the dividing method described later, the function of each functional unit will be briefly described here.

The timer unit 21 is a functional unit that measures the elapsed time since the previous division was performed. Specifically, the timer unit 21 measures the elapsed time since the previous division point (described later) was detected. The beginning of the character string can be regarded as a division point. That is, when no division point is detected in the character string, the timer unit 21 measures the elapsed time from the beginning of the character string. When receiving a reset command from the detection unit 25, the timer unit 21 resets the elapsed time to 0.

The acquisition unit 22 is a function unit that acquires a plurality of words constituting a character string one by one from the head of the character string. The acquisition unit 22 acquires words one by one from the speech recognition device 10.

The calculation unit 23 is a function unit that calculates a forward division likelihood and a backward division likelihood of the word acquired by the acquisition unit 22. The forward division likelihood is a value indicating the likelihood that a character string is divided at a position in front of a word. The forward division likelihood is, for example, a sigmoid function value and may take a value from 0 to 1. The larger the forward division likelihood, the higher the probability that the character string is divided at the position in front of the word. The backward division likelihood is a value indicating the likelihood that a character string is divided at a position immediately after a word. The backward division likelihood is, for example, a sigmoid function value and may take a value from 0 to 1. The larger the backward division likelihood, the higher the probability that the character string is divided at the position immediately after the word. The calculation unit 23 calculates the forward division likelihood and the backward division likelihood using, for example, a deep neural network (DNN).

The calculation unit 24 is a functional unit that calculates a score based on the elapsed time. The calculation unit 24 calculates the score so that the score increases as the elapsed time increases. The score takes a value of, for example, 0 to 1.

The detection unit 25 is a functional unit that detects a division point based on the forward division likelihood and the backward division likelihood. In the present embodiment, the detection unit 25 detects a division point further based on the score. The division point is a position at which a character string is divided. The detection unit 25 detects a division point using, for example, a threshold value Sth1 (first threshold value) for a forward division likelihood and a threshold value Sth2 (second threshold value) for a backward division likelihood. The threshold values Sth1 and Sth2 are predetermined. The threshold value Sth2 may be the same as or different from the threshold value Sth1. When the detection unit 25 detects the division point, the detection unit 25 outputs a reset command to the timer unit 21.

The generation unit 26 is a functional unit that generates a chunk by dividing the character string at the division point. The generation unit 26 divides the character string by inserting a delimiter tag at the division point of the character string, for example, to generate a chunk.

The output unit 27 is a functional unit that outputs a chunk. The output unit 27 transmits (outputs) the chunk to the translation device 30.

Figure 3:
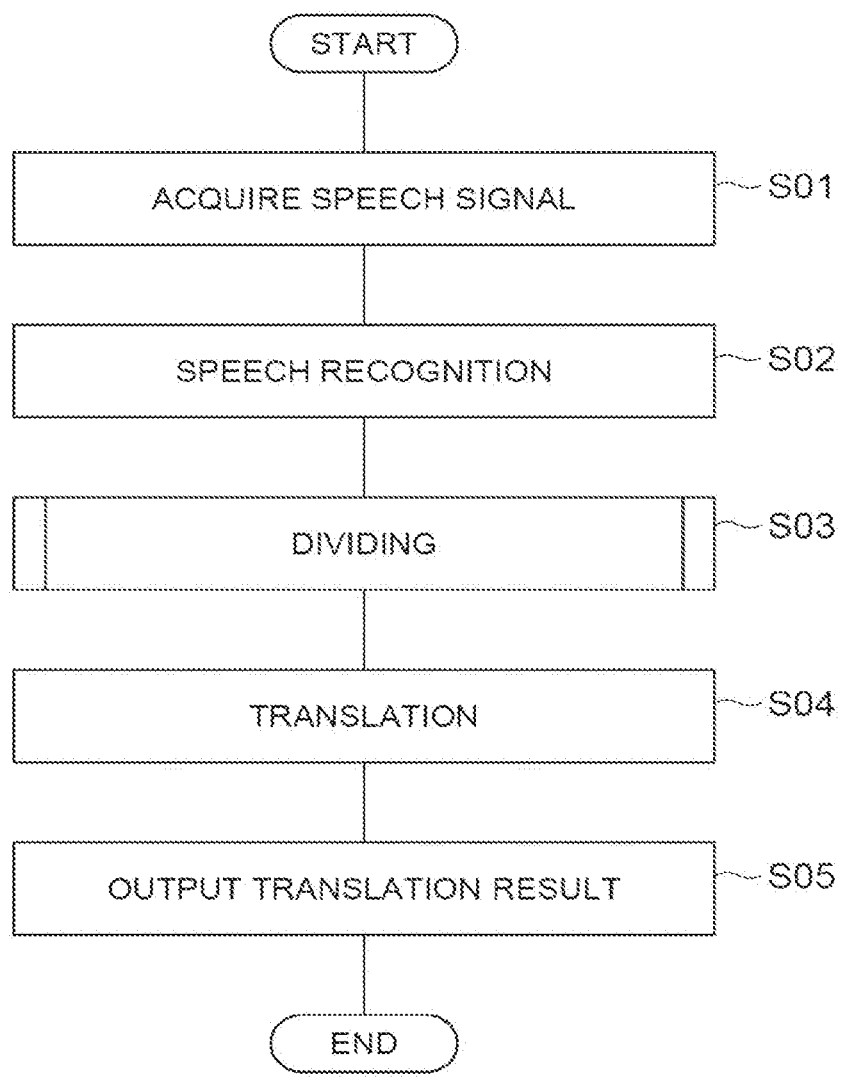
FIG. 3 is a flowchart showing a series of processes of a translation method performed by the translation system shown in FIG. 1.
Figure 4:
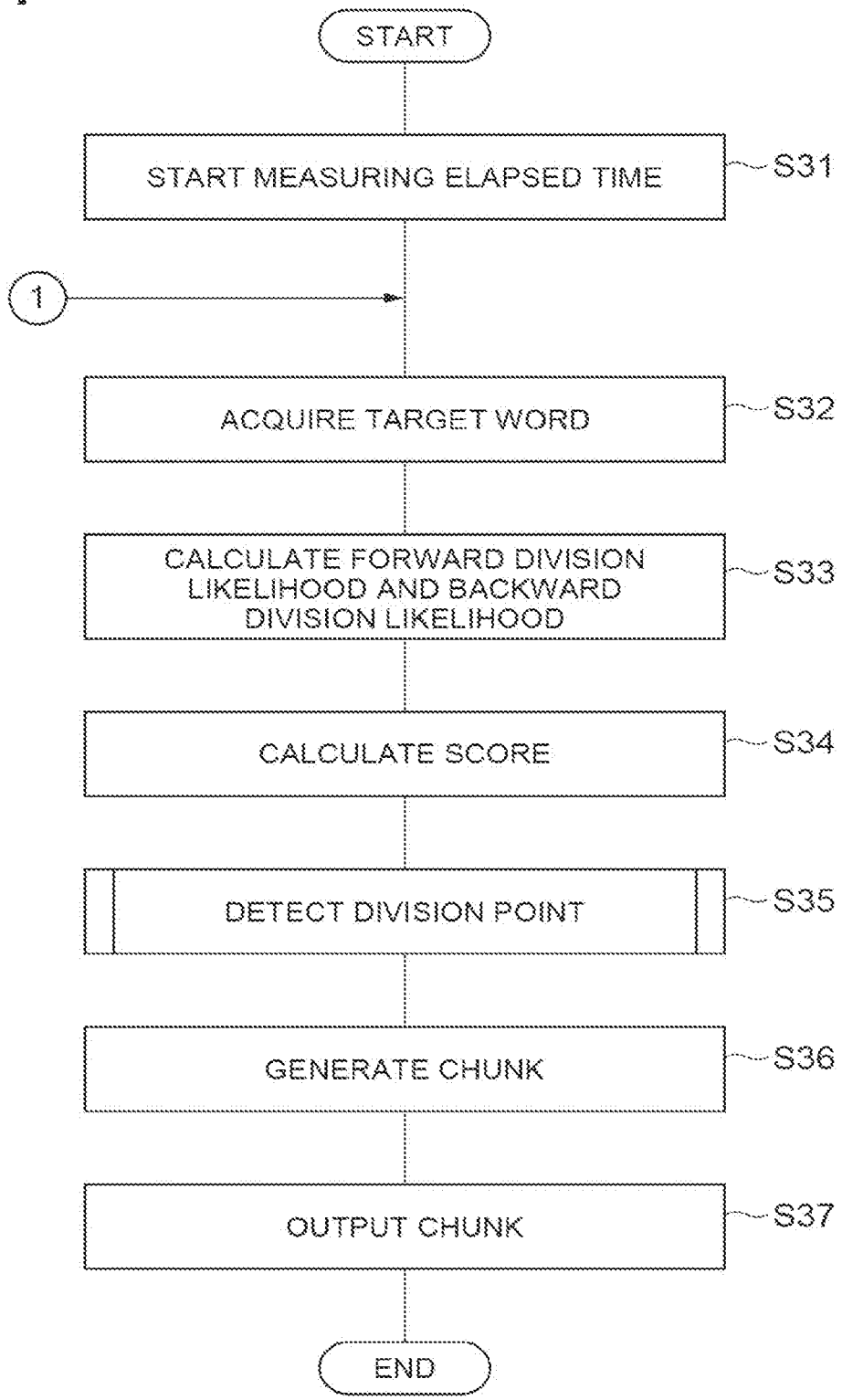
FIG. 4 is a flowchart showing a series of processes of a dividing method performed by the dividing device shown in FIG. 1.
Figure 5:
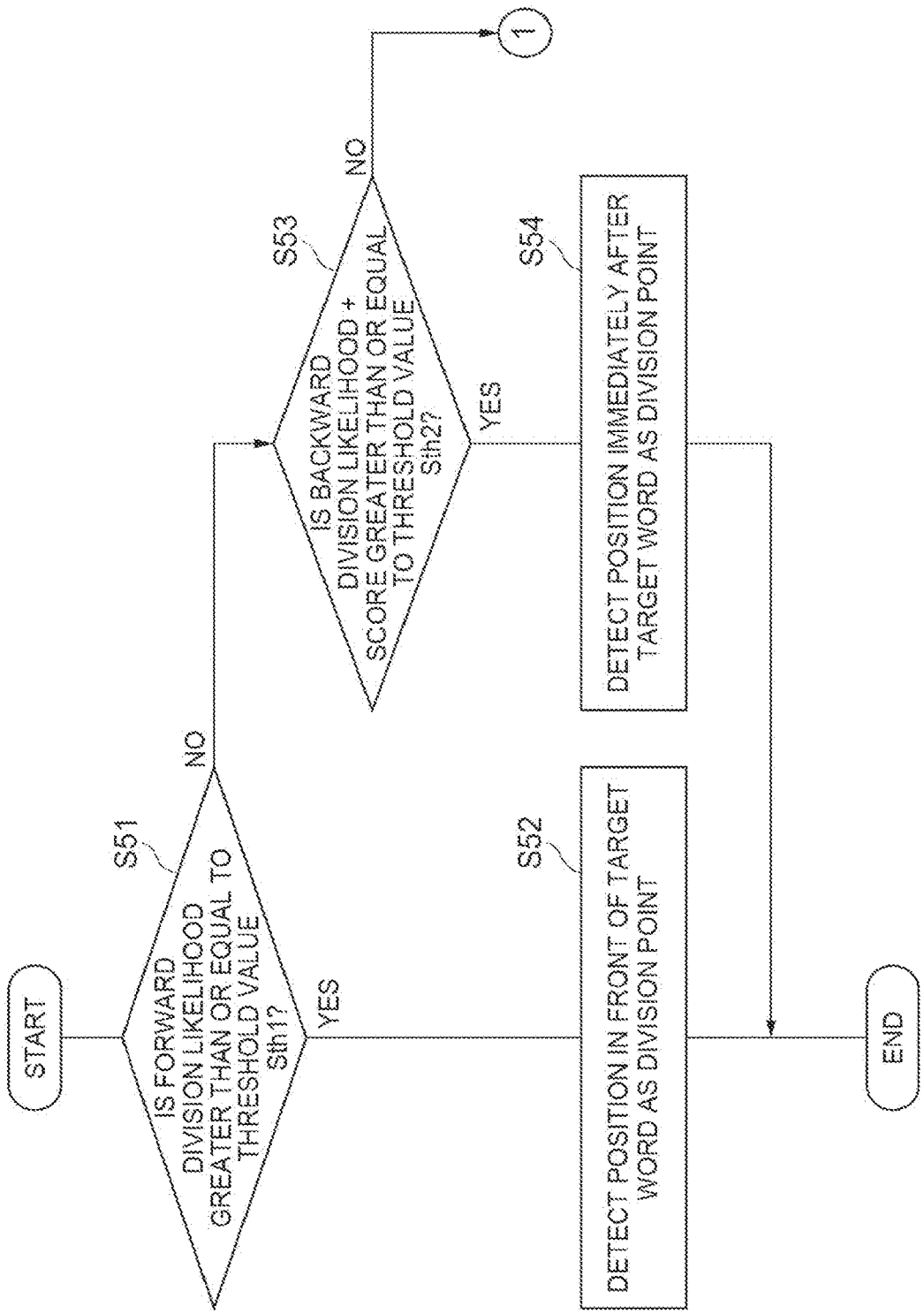
FIG. 5 is a flowchart showing an example of the division point detection process shown in FIG. 4 in detail.
Figure 6:
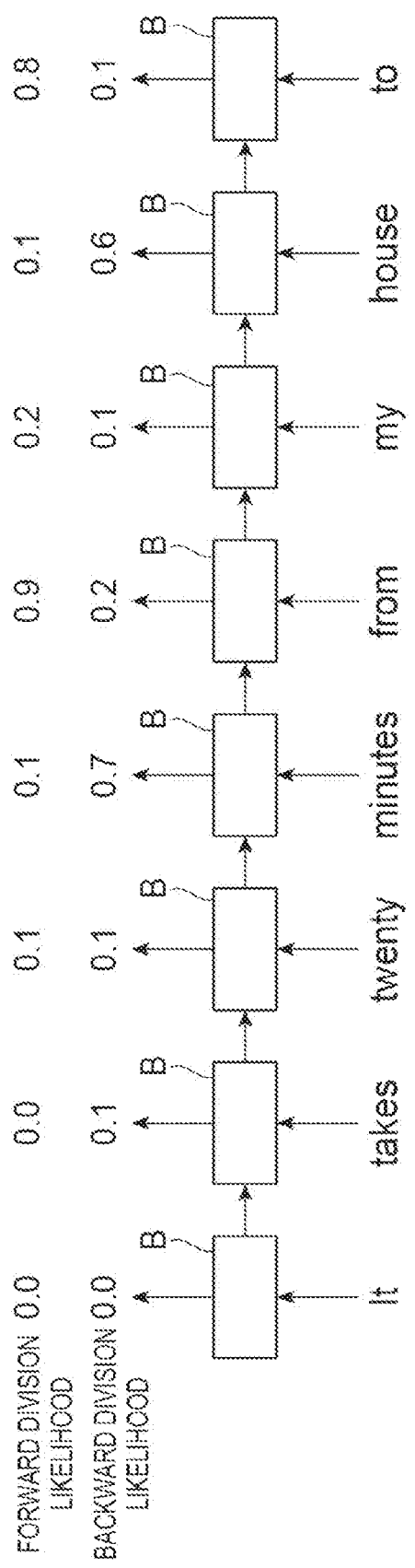
FIG. 6 is a diagram for explaining a process of calculating a forward division likelihood and a backward division likelihood.
Figure 7:
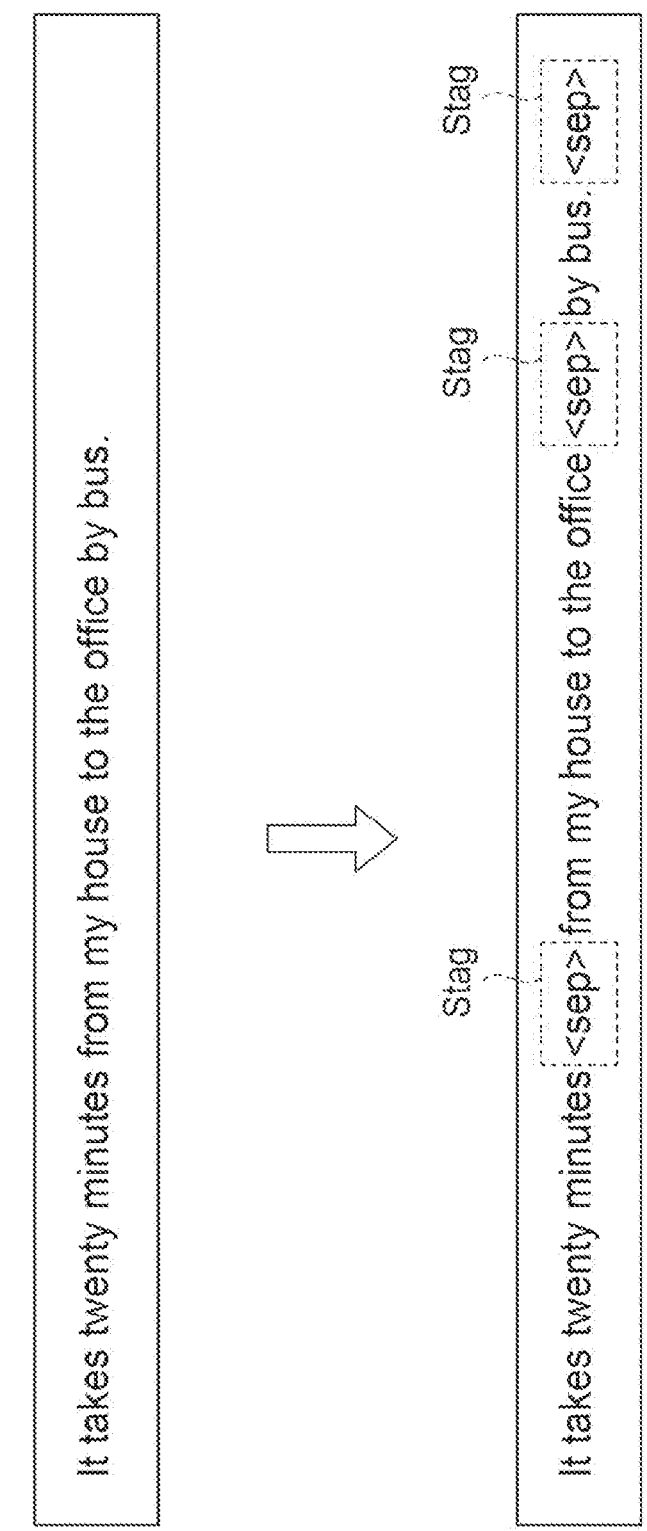
FIG. 7 is a diagram for explaining a process of generating a chunk.

Next, a translation method performed by the translation system 1 will be described with reference to FIGS. 3 to 7. FIG. 3 is a flowchart showing a series of processes of a translation method performed by the translation system shown in FIG. 1. FIG. 4 is a flowchart showing a series of processes of a dividing method performed by the dividing device shown in FIG. 1. FIG. 5 is a flowchart showing an example of the division point detection process shown in FIG. 4 in detail. FIG. 6 is a diagram for explaining a process of calculating a forward division likelihood and a backward division likelihood. FIG. 7 is a diagram for explaining a process of generating a chunk. The series of processes shown in FIG. 3 is started, for example, by a user speaking using a microphone.

As shown in FIG. 3, first, the speech recognition device 10 acquires a speech signal (step 01). For example, the speech signal is input by the user via the microphone.

Subsequently, the speech recognition device 10 performs speech recognition processing on the speech signal (step 02). The speech recognition device 10 performs speech recognition processing using, for example, an acoustic model and a language model. In the present embodiment, since the language model has been learned in units of morphological analysis, the speech recognition device 10 generates a character string divided into word units as a speech recognition result. Then, each time the speech recognition device 10 generates a speech recognition result for one word, the speech recognition device 10 sequentially transmits (outputs) the word to the dividing device 20.

Subsequently, the dividing device 20 performs a dividing process (step 03). In step S03, as shown in FIG. 4, the timer unit 21 starts measuring the elapsed time (step S31). The timer unit 21 starts measuring the elapsed time when the dividing device 20 receives a word positioned at the head of the character string from the speech recognition device 10. Then, the acquisition unit 22 acquires the word (target word) transmitted by the speech recognition device 10 (step S32). Then, the acquisition unit 22 outputs the target word (first word) to the calculation unit 23 and the generation unit 26.

Subsequently, when the calculation unit 23 receives the target word from the acquisition unit 22, the calculation unit 23 calculates the forward division likelihood and the backward division likelihood of the target word (step S33). For example, the calculation unit 23 calculates the forward division likelihood and the backward division likelihood of the target word using the DNN. As shown in FIG. 6, in the present embodiment, the calculation unit 23 uses a long short-term memory (LSTM) as the architecture of the DNN. LSTM is a kind of recurrent neural network (RNN). The LSTM is a neural network configured to sequentially receive each element of time series data in which a plurality of elements are arranged as an input and to exert the influence of the element that has already been input on the output.

As shown in FIG. 6, since the output of the LSTM is recursively input to the LSTM, the LSTM can be represented schematically as a plurality of blocks B arranged in a row. Each block B is an LSTM layer which receives a word as an input and outputs a forward division likelihood and a backward division likelihood of the word. Each block B outputs, to a block B following the block B, a value for exerting influences of the words input to the blocks B preceding the block B. A word following the word input to the block B is input to the following block B. The LSTM is learned in advance by using a plurality of character strings divided into chunks. For example, the LSTM is learned using teacher data in which each word of a character string is set as an input, the backward division likelihood of a word at a position immediately before a division point included in the character string is set to 1, the forward division likelihood of a word at a position immediately after the division point is set to 1, and the other division likelihoods is set to 0.

The calculation unit 23 sequentially inputs the target word from the head of the blocks B of the LSTM. Then, the block B to which the target word is input outputs the forward division likelihood and the backward division likelihood of the target word. Then, the calculation unit 23 outputs the forward division likelihood and the backward division likelihood of the target word to the detection unit 25.

Subsequently, the calculation unit 24 receives information indicating the elapsed time from the timer unit 21 and calculates a score based on the elapsed time (step S34). Specifically, the calculation unit 24 calculates the score so that the score increases as the elapsed time increases. Here, the calculation unit 24 calculates the score by using a scoring method in which the score linearly increases as the elapsed time increases. For example, when the objective is to generate a chunk at a frequency of at least once per 5 seconds, the calculation unit 24 linearly increases the score from 0 to 1 as the elapsed time increases from 0 to 5 seconds. Then, the calculation unit 24 outputs the score to the detection unit 25.

Subsequently, when the detection unit 25 receives the forward division likelihood and the backward division likelihood of the target word from the calculation unit 23, and receives the score from the calculation unit 24, the detection unit 25 detects a division point in the character string (step S35). In step S35, the detection unit 25 first compares the forward division likelihood of the target word with the threshold value Sth1, and determines whether the forward division likelihood is greater than or equal to the threshold value Sth1 or less than the threshold value Sth1 (step S51). When the detection unit 25 determines that the forward division likelihood is greater than or equal to the threshold value Sth1 (step S51; YES), the detection unit 25 detects a position in front of the target word as a division point (step S52). The position in front of the target word means a position between the target word and the word (second word) immediately preceding the target word. Then, the detection unit 25 outputs information indicating the position of the division point detected in step S52 to the generation unit 26 and also outputs a reset command to the timer unit 21, and the division point detection process in step S35 ends.

On the other hand, when the detection unit 25 determines that the forward division likelihood is less than the threshold value Sth1 (step S51; NO), the detection unit 25 calculates a modified backward division likelihood based on the backward division likelihood of the target word and the score. Here, the detection unit 25 calculates the modified backward division likelihood by adding the score to the backward division likelihood of the target word. Then, the detection unit 25 compares the modified backward division likelihood with the threshold value Sth2 and determines whether the modified backward division likelihood is greater than or equal to the threshold value Sth2 or less than the threshold value Sth2 (step S53).

When the detection unit 25 determines that the modified backward division likelihood is greater than or equal to the threshold value Sth2 (step S53; YES), the detection unit 25 detects a position immediately after the target word as a division point (step S54). The position immediately after the target word means a position between the target word and a word (third word) immediately following the target word. Then, the detection unit 25 outputs information indicating the position of the division point detected in step S54 to the generation unit 26 and also outputs a reset command to the timer unit 21, and the division point detection process in step S35 ends.

On the other hand, when the detection unit 25 determines that the modified backward division likelihood is less than the threshold value Sth2 (step S53; NO), the detection unit 25 determines that there is no division point before and after the target word. Then, the acquisition unit 22 acquires the next target word (step S32). Thereafter, steps S33 to S35 are performed again.

For example, in the example shown in FIG. 6, it is assumed that both the threshold value Sth1 and the threshold value Sth2 are set to 0.85. In this case, since the forward division likelihood of the word "from" is 0.9, the position between the word "minutes" and the word "from" is detected as a division point.

Subsequently, when the generation unit 26 receives the information indicating the position of the division point from the detection unit 25, the generation unit 26 generates a chunk (step S36). More specifically, as shown in FIG. 7, the generation unit 26 arranges the words sequentially acquired by the acquisition unit 22 in the order in which the words are acquired, and inserts a delimiter tag Stag indicating the division point at the position of the division point. In the example of FIG. 7, a character string <sep> is used as the delimiter tag Stag. According to this configuration, a character string between the head of the character string and the first delimiter tag Stag and a character string sandwiched between two delimiter tags Stag are generated as chunks. Then, the generation unit 26 outputs the chunk to the output unit 27 every time the chunk is generated (every time the delimiter tag Stag is inserted).

Subsequently, when the output unit 27 receives the chunk (character string including the delimiter tag Stag) generated by the generation unit 26, the output unit 27 transmits (outputs) the chunk (character string including the delimiter tag Stag) to the translation device 30 (step S37). The output unit 27 may transmit only the chunks included in the character string one by one to the translation device 30. Thus, the division step S03 ends.

Subsequently, when the translation device 30 receives the chunk from the dividing device 20, the translation device 30 translates the chunk (step S04). Then, the translation device 30 sequentially outputs translation results (step S05). The translation device 30 outputs a translation result to an output device such as a display and a speaker (not shown).

Thus, the series of processes of the translation method ends. In step S51, the detection unit 25 determines whether or not the forward division likelihood is greater than or equal to the threshold value Sth1, but may determine whether or not the forward division likelihood is greater than the threshold value Sth1. Similarly, in step S53, the detection unit 25 determines whether or not the modified backward division likelihood is greater than or equal to the threshold value Sth2, but may determine whether or not the modified backward division likelihood is greater than the threshold value Sth2.

That is, when at least the condition that the forward division likelihood is greater than the threshold value Sth1 is satisfied, the detection unit 25 detects a position between the target word and the word immediately preceding the target word as a division point. When at least the condition that the forward division likelihood is less than the threshold value Sth1 and the modified backward division likelihood obtained by adding the score to the backward division likelihood is greater than the threshold value Sth2 is satisfied, the detection unit 25 detects a position between the target word and the word immediately following the target word as a division point.

Since the score is used in step S53, step S34 may be performed at any timing after the target word is acquired in step S32 and before the determination in step S53 is performed. When it is determined in step S51 that the forward division likelihood is greater than or equal to the threshold value Sth1, step S34 may be omitted.

In the dividing device 20 described above, words constituting a character string are acquired in order from the head of the character string, and a forward division likelihood indicating the likelihood of dividing the character string at a position in front of the acquired target word and a backward division likelihood indicating the likelihood of dividing the character string at a position immediately after the target word are calculated. Then, a division point is detected based on the forward division likelihood and the backward division likelihood, and a chunk is generated by dividing the character string at the division point. When a character string input sequentially (in real time) such as streaming is to be divided into chunks, it is impossible to divide the character string into chunks while viewing the entire sentence (character string). Since the dividing device 20 calculates the forward division likelihood and the backward division likelihood using one target word and detects the division point, it is not necessary to acquire the entire character string and to process a plurality of character strings. As a result, the time required for generating a chunk can be shortened, and the processing speed can be improved.

In general, in a situation where a word following the target word is not acquired, the calculation accuracy of the forward division likelihood is higher than the calculation accuracy of the backward division likelihood. Therefore, by using the forward division likelihood, the detection accuracy of the division point can be improved. On the other hand, since the speaker may pause the speech in a unit having a certain meaning, the following word may not be input immediately in the middle of the character string. In such a case, even if there is a division point immediately after the target word, the forward division likelihood is not calculated until the following word is input. For this problem, by using the backward division likelihood, the division point can be detected immediately. As a result, a chunk suitable for translation processing by the translation device 30 can be generated, and the time required for generating the chunk can be shortened.

When the forward division likelihood is greater than the threshold value Sth1, the detection unit 25 detects a position between the target word and the word immediately preceding the target word as a division point. As described above, in a situation where a word following the target word is not acquired, the calculation accuracy of the forward division likelihood is higher than the calculation accuracy of the backward division likelihood. Therefore, according to the above-described configuration, since the division point between the target word and the word immediately preceding the target word is detected using the forward division likelihood, the detection accuracy of the division point can be improved. As a result, it is possible to generate a chunk more suitable for the translation processing of the translation device 30.

As described above, the following word may not be input immediately in the middle of the character string. In such a case, even if there is a division point immediately after the target word, the forward division likelihood is not calculated until the following word is input. When the modified backward division likelihood obtained by adding the score to the backward division likelihood is greater than the threshold value Sth2, the detection unit 25 detects a position between the target word and the word immediately following the target word as a division point. According to this configuration, a division point is detected for a character string input in real time while considering the elapsed time. Therefore, the time required for generating a chunk can be shortened. As a result, it is possible to generate a chunk suitable for simultaneous translation (simultaneous interpretation) for continuous translation.

The calculation unit 23 calculates the forward division likelihood and the backward division likelihood using the LSTM. According to this configuration, the forward division likelihood and the backward division likelihood of the target word are calculated in consideration of words preceding the target word. Therefore, since the accuracy of the forward division likelihood and the backward division likelihood can be improved, it is possible to generate a chunk more suitable for the translation processing by the translation device 30.

Although embodiments of the present disclosure have been described above, the present disclosure is not limited to the above-described embodiments.

The dividing device 20 may be configured by a single device coupled physically or logically, or may be configured by two or more devices that are physically or logically separated from each other. For example, the dividing device 20 may be implemented by a plurality of computers distributed over a network such as cloud computing. As described above, the configuration of the dividing device 20 may include any configuration that can realize the functions of the dividing device 20.

The detection unit 25 calculates the modified backward division likelihood by adding the score to the backward division likelihood of the target word, but may calculate the modified backward division likelihood by multiplying the backward division likelihood of the target word by the score.

The detection unit 25 may calculate a modified forward division likelihood based on the forward division likelihood of the target word and the score. For example, the detection unit 25 may calculate the modified forward division likelihood by adding the score to the forward division likelihood of the target word. In this case, the detection unit 25 may perform the determination in step S51 using the modified forward division likelihood.

The dividing device 20 may not include the timer unit 21 and the calculation unit 24. In this case, the detection unit 25 detects the division point based on the forward division likelihood and the backward division likelihood of the target word without considering the elapsed time. In this configuration, when the forward division likelihood of the target word is greater than the threshold value Sth1 (or greater than or equal to the threshold value Sth1), the detection unit 25 detects a position between the target word and the word immediately preceding the target word as a division point. When the forward division likelihood is less than or equal to the threshold value Sth1 (or less than the threshold value Sth1) and the backward division likelihood is greater than the threshold value Sth2 (or greater than or equal to the threshold value Sth2), the detection unit 25 detects a position between the target word and the word immediately following the target word as a division point. As described above, even when a following word is not input immediately in the middle of the character string, the division point can be detected immediately by using the backward division likelihood. Therefore, the time required for generating a chunk can be shortened. As a result, it is possible to generate a chunk suitable for simultaneous translation for continuous translation.

In the simultaneous translation, it is necessary to divide the character string by an appropriate length so as not to interrupt the translation. Therefore, even if the predetermined elapsed time has elapsed, in a case where any division point has not been detected after the beginning of the character string or after the previous division point, the detection unit 25 may detect the division point.

Figure 8:
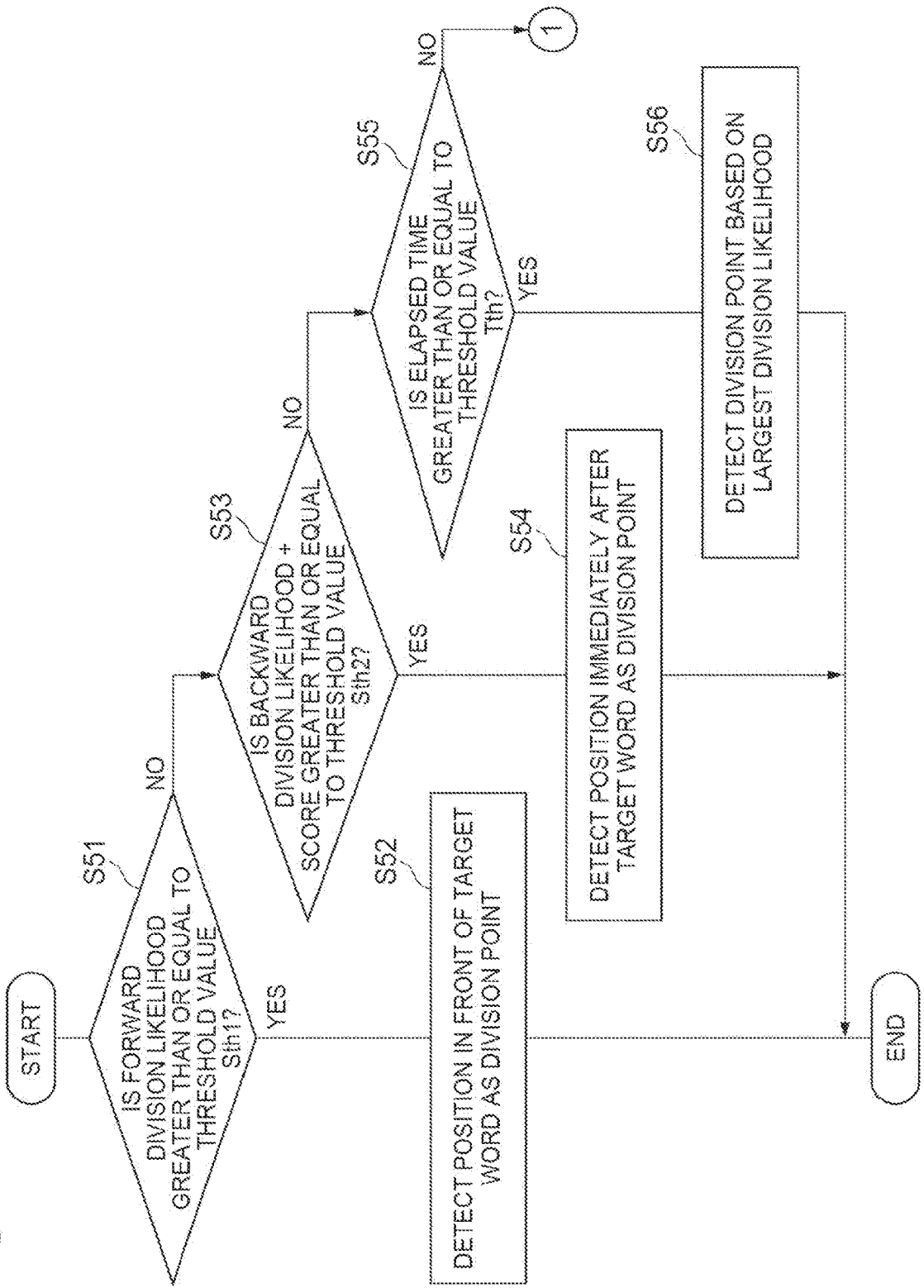
FIG. 8 is a flowchart showing another example of the division point detection process of FIG. 4 in detail.

FIG. 8 is a flowchart showing another example of the division point detection process of FIG. 4 in detail. The division point detection process shown in FIG. 8 is mainly different from the division point detection process shown in FIG. 5 in that step S55 and step S56 are further included. More specifically, in step S53, when it is determined that the modified backward division likelihood is less than the threshold value Sth2 (step S53; NO), the detection unit 25 further compares the elapsed time with a threshold value Tth, and determines whether the elapsed time is greater than or equal to the threshold value Tth (third threshold value) or less than the threshold value Tth (step S55). The threshold value Tth is a maximum waiting time that can be allowed by the processing unit (translation device 30) following the dividing device 20, and is predetermined.

When it is determined that the elapsed time is greater than or equal to the threshold value Tth (step S55; YES), the detection unit 25 detects, as a division point, a position corresponding to the largest division likelihood among the forward division likelihoods of words following the previous division point and the backward division likelihood of the last acquired word (step S56). When no division point is detected from the beginning of the character string, the beginning of the character string is regarded as the previous division point. That is, the detection unit 25 detects, as a division point, a position corresponding to the largest division likelihood among the forward division likelihoods of words following the beginning of the character string and the backward division likelihood of the last acquired word.

When the forward division likelihood of a certain word is the largest, the detection unit 25 detects a position between the certain word and the word immediately preceding the certain word as a division point. When the backward division likelihood of the last acquired word is the largest, the detection unit 25 detects a position between the last word and the word immediately following the last word as a division point. Then, the detection unit 25 outputs information indicating the position of the division point detected in step S56 to the generation unit 26 and also outputs a reset command to the timer unit 21, and the division point detection process in step S35 ends.

On the other hand, when it is determined in step S55 that the elapsed time is less than the threshold value Tth (step S55; NO), the detection unit 25 determines that there is no division point before and after the target word. Then, the acquisition unit 22 acquires the next target word (step S32). Thereafter, steps S33 to S35 are performed again.

In step S55, the detection unit 25 determines whether or not the elapsed time is greater than or equal to the threshold value Tth, but may determine whether or not the elapsed time is greater than the threshold value Tth. That is, when at least the condition that the elapsed time is greater than the threshold value Tth is satisfied, the detection unit 25 performs the process of step S56.

According to this configuration, when the elapsed time reaches the threshold value Tth, the division point is certainly detected. Therefore, it is possible to prevent the processing unit (translation device 30) following the dividing device 20 from waiting for processing. As a result, it is possible to generate a chunk suitable for simultaneous translation for continuous translation.

When the translation result output from the translation device 30 is reproduced by voice, the calculation unit 24 may change the score from 0 to 1 at the time when the reproduction of the translation result of the previous chunk is completed. According to this configuration, even if the division point is not detected until the reproduction of the translation result of the previous chunk is completed, a position between the target word at the time when the reproduction is completed and the word immediately following the target word is detected as a division point. Therefore, it is possible to prevent the processing unit (translation device 30) following the dividing device 20 from waiting for processing. As a result, it is possible to generate a chunk suitable for simultaneous translation for continuous translation.

Note that the block diagrams used in the description of the above embodiments show blocks of functional units. These functional blocks (components) are realized by any combination of at least one of hardware and software. The method for realizing each functional block is not particularly limited. That is, each functional block may be realized using a single device coupled physically or logically. Alternatively, two or more devices that are physically or logically separated from each other may be directly or indirectly connected (e.g., wired, wireless, etc.) to each other, and each functional block may be realized using these devices. The functional blocks may be realized by combining the one device or the plurality of devices mentioned above with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. However, the functions are not limited thereto. For example, a functional block (component) for performing transmission is referred to as a transmitting unit or a transmitter. As explained above, the method for realizing any of the above is not particularly limited.

Figure 9:
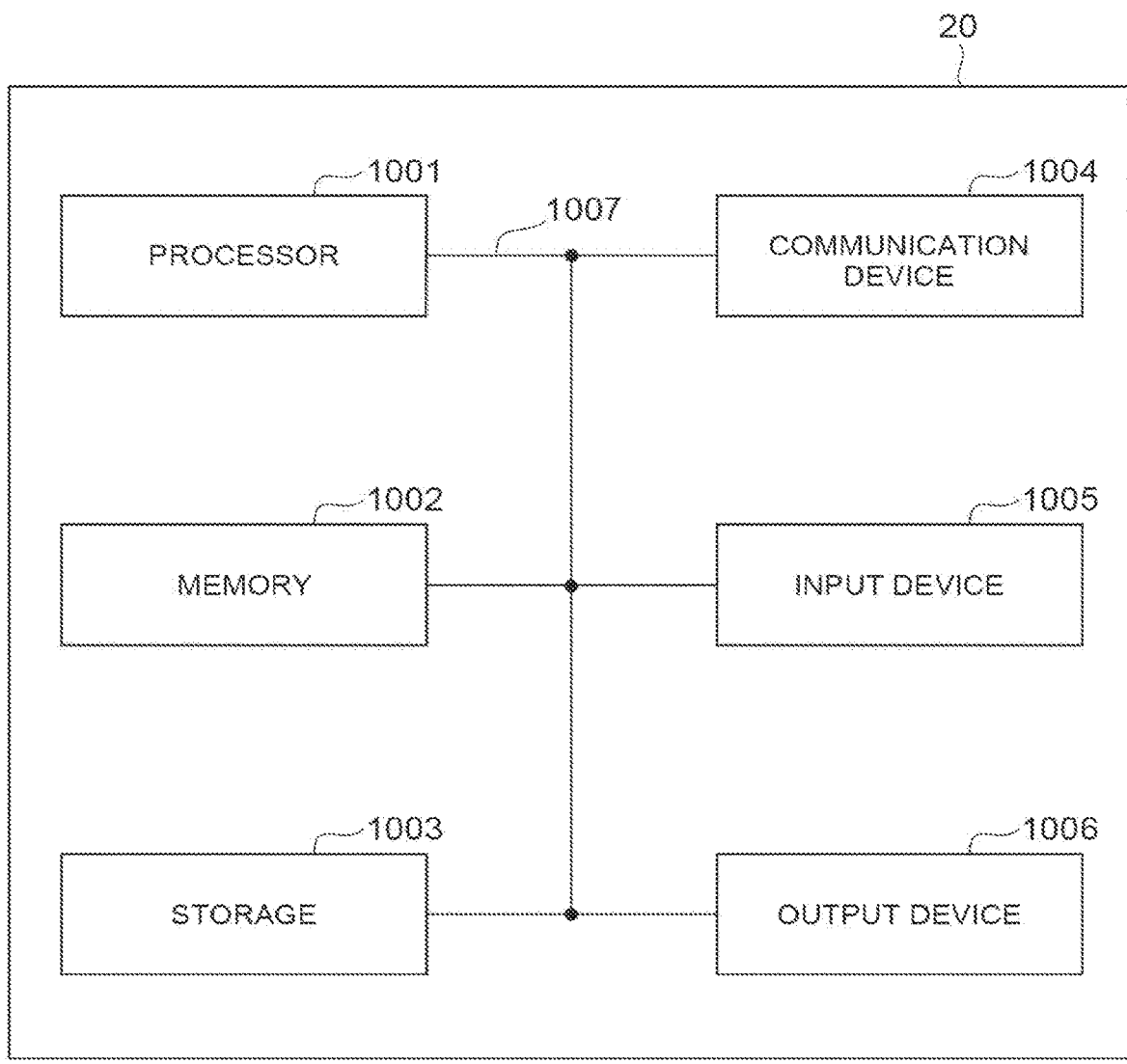
FIG. 9 is a diagram showing a hardware configuration of the dividing device shown in FIG. 1.

For example, the dividing device 20 according to one embodiment of the present disclosure may function as a computer performing the processes of the present disclosure. FIG. 9 is a diagram showing an example of the hardware configuration of the dividing device 20 according to one embodiment of the present disclosure. The above-described dividing device 20 may be physically configured as a computer device including a processor 1001, a memory 1002, a storage 1003, a communication device 1004, an input device 1005, an output device 1006, a bus 1007, and the like.

In the following description, the term "device" can be replaced with a circuit, a device, a unit, etc. The hardware configuration of the dividing device 20 may be configured to include one or more of each device shown in the figure, or may be configured not to include some of the devices.

Each function of the dividing device 20 is realized by causing the processor 1001, by loading predetermined software (program) onto hardware such as the processor 1001 and the memory 1002, to perform computation to control the communication via the communication device 1004 and to control at least one of reading data from and writing data to the memory 1002 and the storage 1003.

The processor 1001 operates, for example, an operating system to control the entire computer. The processor 1001 may be configured by a central processing unit (CPU) including an interface with a peripheral device, a controller, an arithmetic unit, a register, and the like. For example, each function of the above-described dividing device 20 may be realized by the processor 1001.

The processor 1001 reads a program (program code), a software module, data, and the like from at least one of the storage 1003 and the communication device 1004 into the memory 1002, and executes various processes in accordance with these. As the program, a program for causing a computer to execute at least a part of the operations described in the above-described embodiments is used. For example, each function of the dividing device 20 may be realized by a control program stored in the memory 1002 and operating in the processor 1001. Although it has been described that the various processes described above are executed by a single processor 1001, the various processes may be executed simultaneously or sequentially by two or more processors 1001. The processor 1001 may be implemented by one or more chips. The program may be transmitted from a network via a telecommunication line.

The memory 1002 is a computer-readable recording medium, and, for example, may be configured by at least one of a read only memory (ROM), an erasable programmable ROM (EPROM), an electrically erasable programmable ROM (EEPROM), a random access memory (RAM) and the like. The memory 1002 may be referred to as register, cache, main memory (main storage) or the like. The memory 1002 can store executable programs (program codes), software modules, and the like for performing the dividing method according to one embodiment of the present disclosure.

The storage 1003 is a computer-readable recording medium, and, for example, may be configured by at least one of an optical disc such as a compact disc ROM (CD-ROM), a hard disk drive, a flexible disk, a magneto-optical disc (e.g., a compact disc, a digital versatile disc, a Blu-ray (Registered Trademark) disc), a smart card, a flash memory (e.g., a card, a stick, a key drive), a floppy disk (Registered Trademark), a magnetic strip, and the like. The storage 1003 may be referred to as auxiliary storage. The recording medium described above may be, for example, a database, a server, or any other suitable medium that includes at least one of the memory 1002 and the storage 1003.

The communication device 1004 is hardware (transmission/reception device) for performing communication between computers through at least one of a wired network and a wireless network, and is also referred to as a network device, a network controller, a network card, a communication module, or the like. The communication device 1004 may include, for example, a high-frequency switch, a duplexer, a filter, a frequency synthesizer, and the like to realize at least one of frequency division duplex (FDD) and time division duplex (TDD). For example, the acquisition unit 22, the output unit 27, and the like described above may be realized by the communication device 1004.

The input device 1005 is an input device (e.g., a keyboard, a mouse, a microphone, a switch, a button, a sensor, or the like) that accepts input from the outside. The output device 1006 is an output device (e.g., a display, a speaker, an LED lamp, etc.) that performs an output to the outside. The input device 1005 and the output device 1006 may be integrated (e.g., a touch panel).

Devices such as the processor 1001 and the memory 1002 are connected to each other with the bus 1007 for communicating information. The bus 1007 may be configured using a single bus or using a separate bus for every two devices.

The dividing device 20 may include hardware such as a microprocessor, a digital signal processor (DSP), an application specific integrated circuit (ASIC), a programmable logic device (PLD), and a field programmable gate array (FPGA). Some or all of each functional block may be realized by the hardware. For example, the processor 1001 may be implemented using at least one of such hardware components.

Notification of information is not limited to the aspects/embodiments described in the present disclosure, and may be performed using other methods.

In the processing procedures, sequences, flowcharts, and the like of each of the aspects/embodiments described in the present disclosure, the order of processing may be interchanged, as long as there is no inconsistency. For example, the various steps of the methods described in the present disclosure are presented using exemplary order and are not limited to the particular order presented.

Information and the like may be output from an upper layer to a lower layer or from a lower layer to an upper layer. Information and the like may be input and output via a plurality of network nodes.

The input/output information and the like may be stored in a specific location (e.g., a memory) or may be managed using a management table. The information to be input/output and the like can be overwritten, updated, or added. The output information and the like may be deleted. The input information and the like may be transmitted to another device.

The determination may be performed by a value (0 or 1) represented by one bit, a truth value (Boolean: true or false), or a comparison of a numerical value (for example, a comparison with a predetermined value).

The aspects/embodiments described in the present disclosure may be used separately, in combination, or switched with the execution of each aspect/embodiment. The notification of the predetermined information (for example, notification of "being X") is not limited to being performed explicitly, and may be performed implicitly (for example, without notifying the predetermined information).

Although the present disclosure has been described in detail above, it is apparent to those skilled in the art that the present disclosure is not limited to the embodiments described in the present disclosure. The present disclosure may be implemented as modifications and variations without departing from the spirit and scope of the present disclosure as defined by the claims. Accordingly, the description of the present disclosure is for the purpose of illustration and has no restrictive meaning relative to the present disclosure.

Software, whether referred to as software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, etc.

Software, an instruction, information, and the like may be transmitted and received via a transmission medium. For example, if software is transmitted from a website, a server, or any other remote source using at least one of wired technologies (such as a coaxial cable, an optical fiber cable, a twisted pair, and a digital subscriber line (DSL)) and wireless technologies (such as infrared light and microwaves), at least one of these wired and wireless technologies is included within the definition of a transmission medium.

The information, signals, and the like described in the present disclosure may be represented using any of a variety of different technologies. For example, data, instructions, commands, information, signals, bits, symbols, chips, etc., which may be referred to throughout the above description, may be represented by voltages, electric currents, electromagnetic waves, magnetic fields or particles, optical fields or photons, or any combination thereof.

It should be noted that terms described in the present disclosure and terms necessary for understanding the present disclosure may be replaced with terms having the same or similar meanings.

The terms "system" and "network" as used in the present disclosure are used interchangeably.

The information, parameters, and the like described in the present disclosure may be expressed using absolute values, relative values from a predetermined value, or other corresponding information.

The names used for the parameters described above are in no way restrictive. Further, the mathematical expressions and the like using these parameters may be different from the contents explicitly disclosed in the present disclosure.

The term "determining" as used in the present disclosure may encompass a wide variety of operations. The "determining" may include, for example, judging, calculating, computing, processing, deriving, investigating, looking up, search, inquiry (e.g., searching in a table, a database, or another data structure), and ascertaining. The "determining" may include receiving (e.g., receiving information), transmitting (e.g., transmitting information), input, output, and accessing (e.g., accessing data in a memory). The "determining" may include resolving, selecting, choosing, establishing, and comparing. That is, the "determining" may include some operations that may be considered as the "determining". The "determining" may be read as "assuming", "expecting", "considering", etc.

The term "connected", "coupled", or any variation thereof means any direct or indirect connection or coupling between two or more elements. One or more intermediate elements may be present between two elements that are "connected" or "coupled" to each other. The coupling or connection between the elements may be physical, logical, or a combination thereof. For example, "connection" may be read as "access". When "connect" or "coupling" is used in the present disclosure, the two elements to be connected or coupled can be considered to be "connected" or "coupled" to each other using one or more electrical wires, cables, printed electrical connections, and as some non-limiting and non-exhaustive example, electromagnetic energy having wavelengths in the radio frequency region, the microwave region, and light (both visible and invisible) regions.

The term "based on" as used in the present disclosure does not mean "based only on" unless otherwise specified. In other words, the term "based on" means both "based only on" and "based at least on".

Any reference to an element using the designations "first", "second", etc., as used in the present disclosure does not generally limit the amount or order of the element. Such designations may be used in the present disclosure as a convenient way to distinguish between two or more elements. Thus, references to the first and second elements do not imply that only two elements may be adopted, or that the first element must precede the second element in any way.

The "unit" in the configuration of each of the above devices may be replaced with "circuit", "device", etc.

When "include", "including", and variations thereof are used in the present disclosure, these terms are intended to be inclusive, as well as the term "comprising". Furthermore, the term "or" as used in the present disclosure is intended not to be an exclusive OR.

In the present disclosure, where article such as "a", "an" and "the" in English is added by translation, the present disclosure may include that the noun following the article is plural.

In the present disclosure, the term "A and B are different" may mean that "A and B are different from each other". The term may mean that "each of A and B is different from C". Terms such as "separated" and "combined" may also be interpreted in a similar manner to "different".

REFERENCE SIGNS LIST

1 Translation system
10 Speech recognition device

20 Dividing device
21 Timer unit
22 Acquisition unit
23 Calculation unit (first calculation unit)
24 Calculation unit (second calculation unit)
25 Detection unit
26 Generation unit
27 Output unit
30 Translation device
1001 Processor
1002 Memory
1003 Storage
1004 Communication device
1005 Input device
1006 Output device
1007 Bus

The invention claimed is:

1. A translation system comprising:
processing circuitry configured to
receive a speech signal in a first language;
convert the speech signal into a character string;
acquire a plurality of words constituting the character string one by one from a head of the character string;
calculate a forward division likelihood indicating a likelihood of dividing the character string at a position in front of an acquired first word and a backward division likelihood indicating a likelihood of dividing the character string at a position immediately after the first word;
detect a division point based on the forward division likelihood and the backward division likelihood, the division point being a position at which the character string is divided;
generate a chunk by dividing the character string at the division point;
output the chunk; and
perform language translation on the outputted chunk and sequentially output translation results obtained by sequentially translating a plurality of chunks.

2. The translation system according to claim 1, wherein when the forward division likelihood is greater than a predetermined first threshold value, the processing circuitry detects, as the division point, a position between the first word and a second word immediately preceding the first word.

3. The translation system according to claim 2, wherein when the forward division likelihood is less than the first threshold value and the backward division likelihood is greater than a predetermined second threshold value, the processing circuitry detects, as the division point, a position between the first word and a third word immediately following the first word.

4. The translation system according to claim 2, wherein the processing circuitry is configured to
measure an elapsed time from detection of a previous division point; and
calculate a score based on the elapsed time,
wherein when the forward division likelihood is less than the first threshold value and a value obtained based on the backward division likelihood and the score is greater than a predetermined second threshold value, the processing circuitry detects, as the division point, a position between the first word and a third word immediately following the first word.

5. The translation system according to claim 4, wherein when the elapsed time is greater than a predetermined third threshold value, the processing circuitry detects, as the division point, a position corresponding to a largest division likelihood among the forward division likelihood of each word following a previous division point and the backward division likelihood of a last acquired word.

6. The translation system according to claim 1, wherein the processing circuitry calculates the forward division likelihood and the backward division likelihood using a long short-term memory (LSTM).

7. The translation system according to claim 2, wherein the processing circuitry calculates the forward division likelihood and the backward division likelihood using a long short-term memory (LSTM).

8. The translation system according to claim 3, wherein the processing circuitry calculates the forward division likelihood and the backward division likelihood using a long short-term memory (LSTM).

9. The translation system according to claim 4, wherein the processing circuitry calculates the forward division likelihood and the backward division likelihood using a long short-term memory (LSTM).

10. The translation system according to claim 5, wherein the processing circuitry calculates the forward division likelihood and the backward division likelihood using a long short-term memory (LSTM).

11. A method, implemented by processing circuitry of a translation system, comprising:
receiving a speech signal in a first language;
converting the speech signal into a character string;
acquiring a plurality of words constituting the character string one by one from a head of the character string;
calculating a forward division likelihood indicating a likelihood of dividing the character string at a position in front of an acquired first word and a backward division likelihood indicating a likelihood of dividing the character string at a position immediately after the first word;
detecting a division point based on the forward division likelihood and the backward division likelihood, the division point being a position at which the character string is divided;
generating a chunk by dividing the character string at the division point;
outputting the chunk; and
performing language translation on the outputted chunk and sequentially outputting translation results obtained by sequentially translating a plurality of chunks.

* * * * *